United States Patent
Benamou

(10) Patent No.: US 11,282,089 B1
(45) Date of Patent: Mar. 22, 2022

(54) RECALLED PRODUCT DETECTION AND NOTIFICATION SYSTEM AND RELATED METHODS

(71) Applicant: INMAR SUPPLY CHAIN SOLUTIONS, LLC, Winston-Salem, NC (US)

(72) Inventor: Andreas Marc Benamou, Spicewood, TX (US)

(73) Assignee: INMAR SUPPLY CHAIN SOLUTIONS, LLC, Winston-Salem, NC (US)

( * ) Notice: Subject to any disclaimer, the term of this patent is extended or adjusted under 35 U.S.C. 154(b) by 385 days.

(21) Appl. No.: 16/009,867

(22) Filed: Jun. 15, 2018

(51) Int. Cl.
    *G06Q 30/00* (2012.01)
    *H04N 5/232* (2006.01)
    *H04B 1/3827* (2015.01)
    *G06K 9/00* (2022.01)

(52) U.S. Cl.
    CPC ....... *G06Q 30/014* (2013.01); *G06K 9/00664* (2013.01); *H04B 1/3827* (2013.01); *H04N 5/23206* (2013.01)

(58) Field of Classification Search
    CPC .............. G06Q 30/014; G06K 9/00664; H04B 1/3827; H04N 5/23206
    See application file for complete search history.

(56) References Cited

U.S. PATENT DOCUMENTS 9,053,510 B2    6/2015    Crum
2010/0086192 A1*   4/2010   Grigsby ................... G06F 16/58
                                                              382/141
2012/0005105 A1    1/2012   Beier et al.
(Continued)

FOREIGN PATENT DOCUMENTS

KR      20110096775 A * 8/2011 .............. F25B 49/02

OTHER PUBLICATIONS

I. Gunawan, I. Vanany and E. Widodo, "The influence of traceability system practice to product recall capability in bulk food industry: Observation and interview," 2017 IEEE (IEEM), 2017, pp. 1688-1692, doi: 10.1109/IEEM.2017 (Year: 2017).*

(Continued)

*Primary Examiner* — Michael Young
(74) *Attorney, Agent, or Firm* — Allen, Dyer, Doppelt + Gilchrist, P.A.

(57) ABSTRACT

A recalled product detection and notification system may include a camera device positioned to capture image data of consumable products and communicate associated image data via the cloud. The system may also include a recalled products server that may include a memory for storing product category data associated with recalled products and product identifier data associated with the recalled products, and a processor coupled to the memory. The processor may be configured to communicate via the cloud with the camera device and download image data therefrom, and determine if the image data corresponds to a product category of recalled products based upon the product category data, and when so, generate a first user notification. The processor may also be configured to determine if the image data corresponds to a recalled product based upon the product identifier data, and when so, generate a second user notification.

24 Claims, 11 Drawing Sheets

(56) References Cited

U.S. PATENT DOCUMENTS

| | | | |
|---|---|---|---|
| 2012/0323678 A1 | 12/2012 | Mansfield, Jr. | |
| 2013/0036061 A1 | 2/2013 | Alexander et al. | |
| 2013/0067375 A1* | 3/2013 | Kim | G05F 1/66 |
| | | | 715/769 |
| 2017/0178060 A1* | 6/2017 | Schwartz | G06K 9/6267 |
| 2017/0293882 A1* | 10/2017 | Beier | G06Q 10/08 |
| 2017/0315700 A1* | 11/2017 | Rolih | G06Q 30/0277 |
| 2018/0285649 A1* | 10/2018 | Shi | G01N 33/12 |
| 2019/0012619 A1* | 1/2019 | Moss | G09B 7/02 |

OTHER PUBLICATIONS

TensorFlow; Image Recognition; web address: https://www.tensorflow.org/tutorials/image_recognition; retrieved from the internet on Jun. 15, 2018; 11 pages.

Microsoft; Perception-powered intelligent edge dev kits; web address: https://developer.microsoft.com/en-us/perception; retrieved from the internet on Jun. 15, 2018; 5 pages.

* cited by examiner

RECALLED PRODUCT DETECTION AND NOTIFICATION SYSTEM AND RELATED METHODS

TECHNICAL FIELD

The present embodiments are directed to the field of electronics, and more particularly, to detection and notification of recalled products and related methods.

BACKGROUND

A product recall is a request, for example, made by a product manufacturer or government agency, to discontinue the use of a product (e.g., return or destroy). The product subject to the recall may have a defect associated with it that caused the recall. Relatively quick notification of a recalled product may be particularly desirable to reduce potential negative effects that may occur as a result of use of the recalled product.

Notification of a recalled product may come primarily from news reports and word of mouth. However, upon learning of a food recall, a consumer may typically not review maintained consumable products for the recalled product. This may be indicative that the consumer, while considering the recall of the product as being relatively important, as not being applicable to themselves.

SUMMARY

A recalled product detection and notification system may include a camera device positioned to capture image data of consumable products and communicate associated image data via the cloud. The recalled product detection and notification system may also include a recalled products server that may include a memory configured to store product category data associated with recalled products and product identifier data associated with the recalled products, and a processor coupled to the memory. The processor may be configured to communicate via the cloud with the camera device and download image data therefrom, and determine if the image data corresponds to a product category of recalled products based upon the product category data, and when so, generate a first user notification. The processor may also be configured to determine if the image data corresponds to a recalled product based upon the product identifier data, and when so, generate a second user notification.

The memory may be configured to store historical product identifier data corresponding to previously purchased consumable products of a given user. The processor may be configured to determine if the image data corresponds to a recalled product based upon the historical product identifier data for the given user, and when so, generate a third user notification, for example.

The camera device may be configured to be positioned within a refrigerator, for example. The refrigerator may include a display, and the processor may be configured to communicate the first and second user notifications to the display for display thereon.

The camera device may include a mobile wireless communications device, for example. The camera device may be configured to be positioned at a fixed location, for example.

The camera device may include a camera and wireless communications circuitry coupled thereto to wirelessly communicate the image data. The first user notification may be indicative that the consumable product may be subject to a recall, and the second user notification may be indicative that the consumable product is subject to a recall, for example.

The recalled product detection and notification system may include a mobile wireless communications device associated with a user. The processor may be configured to wirelessly communicate the first and second user notifications to the mobile wireless communications device, for example. The mobile wireless communications device may be configured to display the first and second user notifications, the first and second user notifications having respective different first and second visual characteristics associated therewith. The processor may be configured to communicate the first and second user notifications as at least one of an email and a short message service (SMS) message, for example.

The product category data may include product physical characteristic data. The product identifier data may include uniform product code (UPC) data. The product identifier data may include price look-up (PLU) data, for example.

A method aspect is directed to a method of generating a recalled product notification. The method may include using a recalled products server to communicate via the cloud with a camera positioned to capture image data of consumable products and communicate associated image data via the cloud, and download image data from the cloud. The method may also include using the recalled products server to determine if the image data corresponds to a product category of recalled products based upon product category data, and when so, generate a first user notification. The method may further include using the recalled products server to determine if the image data corresponds to a recalled product based upon product identifier data, and when so, generate a second user notification.

A computer readable medium aspect is directed to a non-transitory computer readable medium for a recalled products server that includes a memory configured to store product category data associated with recalled products and product identifier data associated with the recalled products and a processor coupled to the memory. The non-transitory computer readable medium includes computer executable instructions that when executed by the processor cause the processor to perform operations. The operations may include communicating via the cloud with a camera positioned to capture image data of consumable products and communicate associated image data via the cloud, and downloading image data from the cloud. The operations may also include determining if the image data corresponds to a product category of recalled products based upon the product category data, and when so, generating a first user notification. The operations may further include determining if the image data corresponds to a recalled product based upon the product identifier data, and when so, generating a second user notification.

BRIEF DESCRIPTION OF THE DRAWINGS

FIG. 3b is a continuation of the flow diagram of FIG. 3a.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
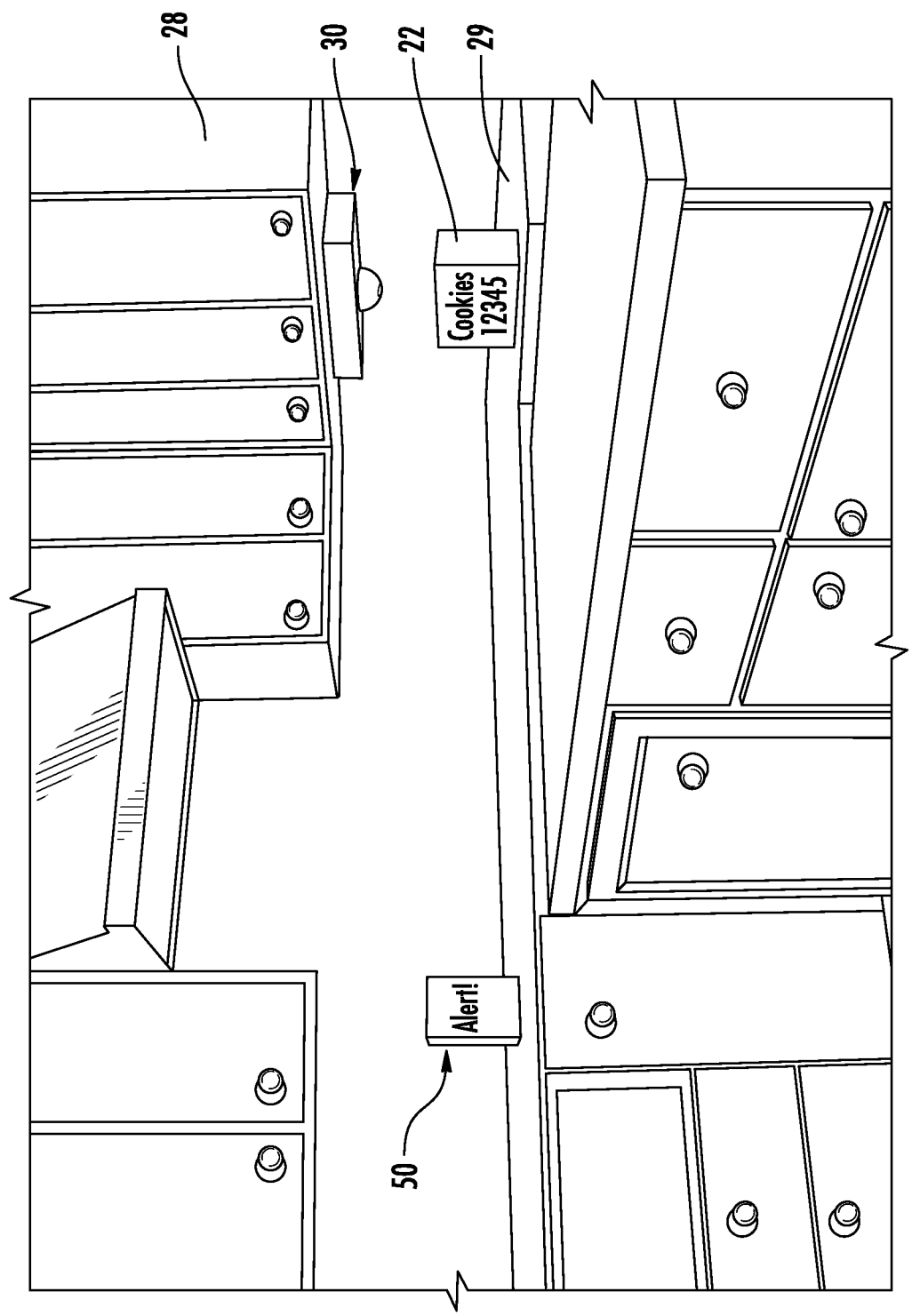
FIG. 1 is a diagram of a food preparation area including a recalled product detection and notification system according to an embodiment.
Figure 2:
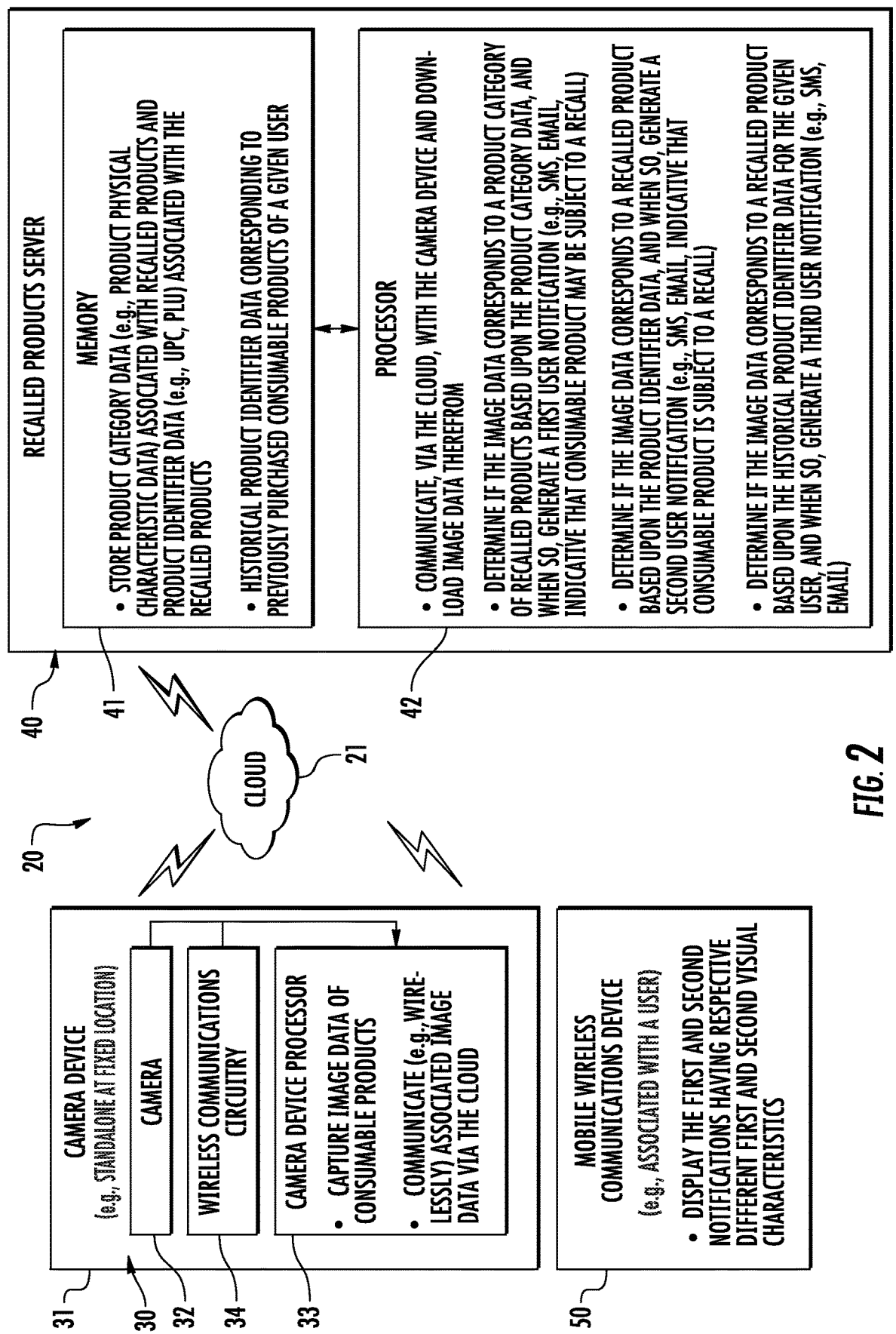
FIG. 2 is a schematic diagram of the recalled product detection and notification system of FIG. 1.

Referring initially to FIGS. 1-2, a recalled product detection and notification system 20 includes a camera device 30 positioned to capture image data of consumable products 22 and communicate associated image data via the cloud 21. The camera device 30 is positioned to be at a fixed location, for example, under a kitchen cabinet 28 facing a countertop or food preparation area 29. Of course, the camera device 30 may be positioned elsewhere.

The camera device 30 includes a housing 31 and a camera 32 or image acquisition device carried by the housing, and a camera device processor 33 coupled to the camera 32. Wireless communications circuitry 34 is also carried by the housing 31 and coupled to the camera device processor 33. The camera device processor 33 and the wireless communications circuitry 34 cooperate to wirelessly communicate the image data, for example, to the cloud 21. In some embodiments, the camera device 30 may not include wireless communications circuitry 34 and may operate based upon a wired communications link.

As will be appreciated by those skilled in the art, the camera device 30 operates in an "always-on" configuration watching or acquiring image data as consumable products 22, i.e., food, are prepped or placed on the countertop for storage or use in cooking, within a pantry or food storage area. As the consumable products 22 are moved across or placed within the viewing area of the camera device 30, the camera device captures image data of the consumable products and wirelessly communicates the image data via the cloud 21 to a recalled products server 40. The rate at which may the camera device 30 captures image data may be adjustable, for example, on a frames per second basis, however, it should be understood by those skilled in the art that a sufficiently high frame rate be maintained so that the consumable products 22 can be identified from the image data.

The recalled products server 40 includes a memory 41 for storing product category data associated with recalled products and product identifier data associated with the recalled products. The product category data and/or product identifier data from recalled products may be retrieved from any one or more recalled product databases, as will be appreciated by those skilled in the art. Product category data may include physical product characteristic data, for example, a shape, color, and/or packaging data (e.g., box text, color, shape, size). The product category data may include other and/or additional types of product category data, for example, for identifying whether a given consumable product 22 is within a given category, as will be described in further detail below.

Product identifier data may include uniform product code (UPC) data and/or price look-up (PLU) data. The product identifier data may include other and/or additional data for identifying a given consumable product 22, for example, stock keeping unit (SKU) data.

In some embodiments, the memory 41 may store historical product identifier data corresponding to previously purchased consumable products 22 of a given user. More particularly, the historical product identifier data may include UPCs and/or PLUs of consumable products 22 previously purchased by the given user. Transaction logs and/or a loyalty program may be used (e.g., based upon a unique user identifier), to match the given user with the corresponding purchase history, as will be understood by those skilled in the art.

Figure 3A:
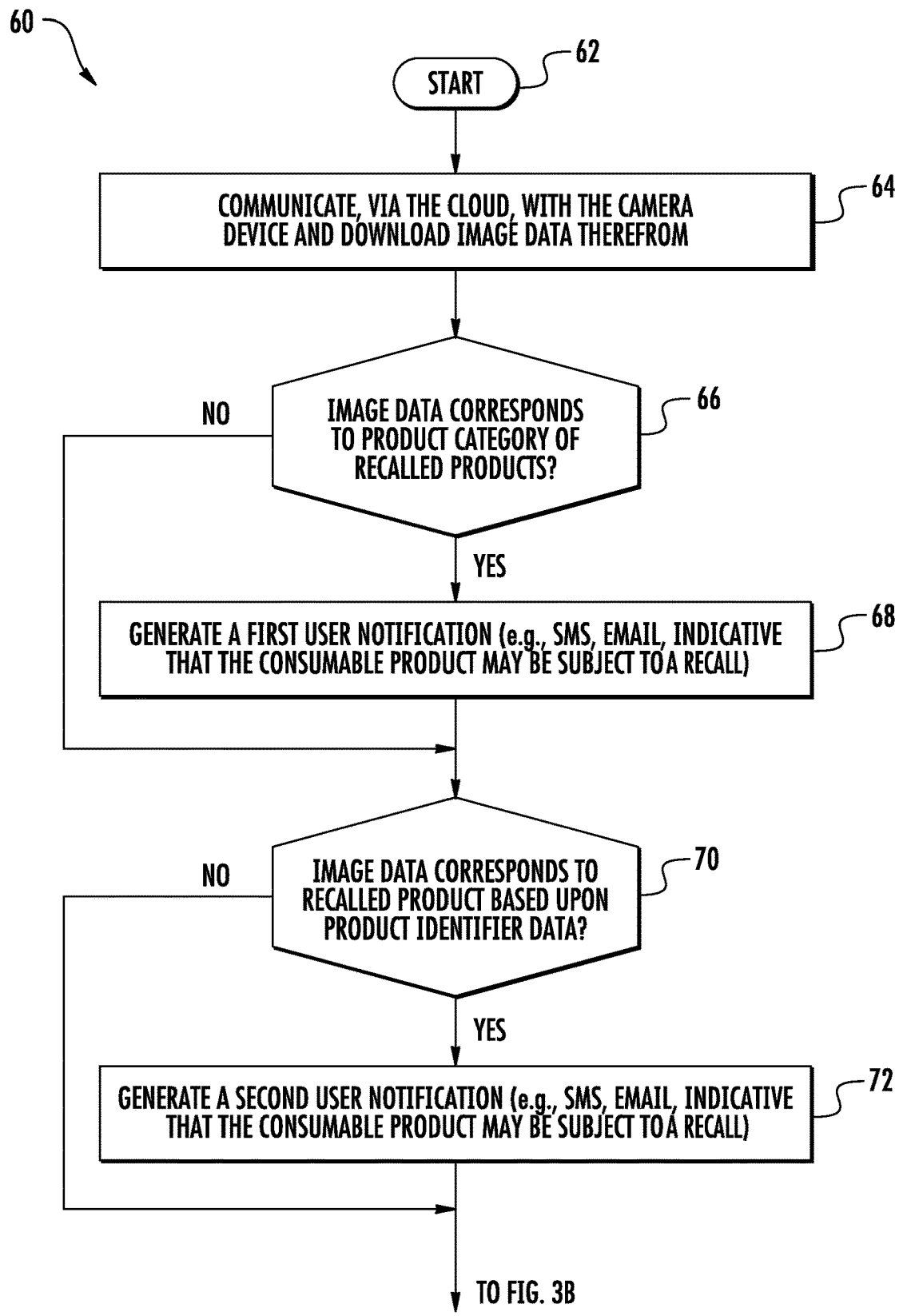
FIG. 3a is a flow diagram of operation of the recalled product detection and notification system of FIG. 2.
Figure 3B:
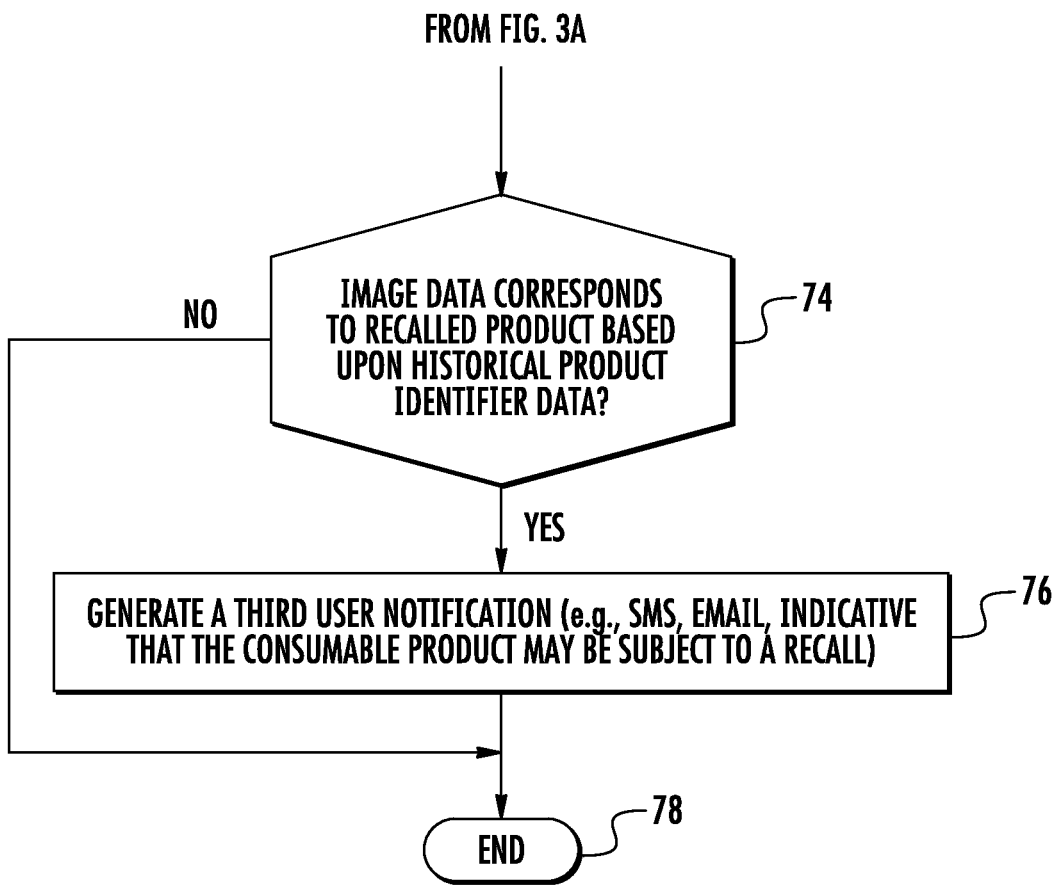
Figure 4:
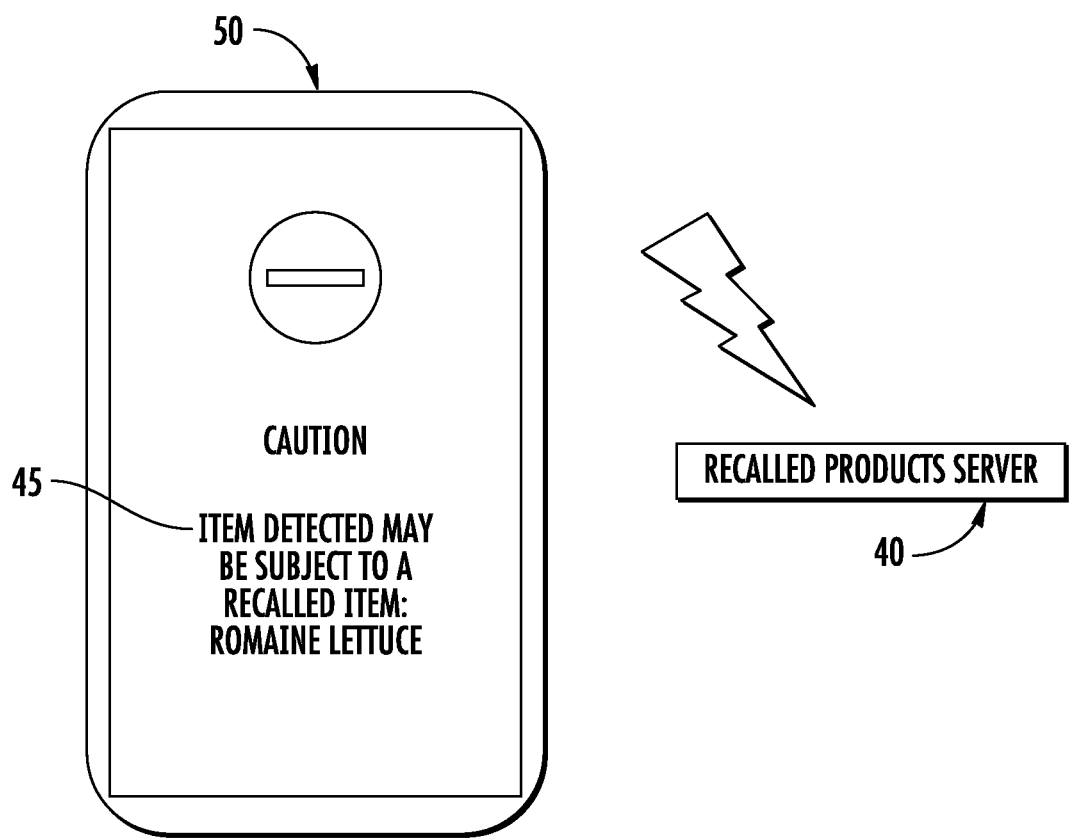
FIG. 4 is a schematic diagram of a portion of a recalled product detection and notification system illustrating a first user notification in accordance with an embodiment.

The recalled products server 40 also includes a processor 42 coupled to the memory 41. Referring now additionally to FIGS. 3a and 3b and the flowchart 60, beginning at Block 62, operations of the recalled product detection and notification system 20, and more particularly, the recalled products server 40 will now be described. It should be understood that while functions of the recalled products server 40 may be described herein, the functions of the recalled products server are based upon cooperation with the memory 41 and processor 42.

At Block 64, the recalled products server communicates via the cloud 21 with the camera device 30 and downloads the image data therefrom, for example, wirelessly. At Block 66, the recalled products server 40 determines if the image data corresponds to a product category of recalled products based upon the product category data, and when so, generates a first user notification 45 (Block 68). If it is determined at Block 66 that the image data does not correspond (e.g., sufficient to exceed a threshold), the operations continue to Block 70.

The first user notification 45 may be considered a first level notification, for example, identifying a potential risk or that a consumable product 22 may be subject to a recall. In an exemplary implementation, romaine lettuce may be subject to a recall, and if the camera device 30 captures image data of romaine lettuce on a countertop in a food preparation area, the recalled products server 40 may determine that the image data is indicative of or looks like romaine lettuce or similar looking vegetable. The recalled products server 40 may then generate a first user notification 45 that the object representative of the image data appears to be similar to (i.e., in the same category) romaine lettuce, which is subject to a recall.

The first user notification 45 may be communicated, for example, wirelessly, from the recalled products server 40 to a mobile wireless communications device 50 associated with a user. The first user notification 45 may be an email, short message service (SMS) message, visual notification, or other type of notification. For example, with respect to a visual notification, the mobile wireless communications 50 may display the first user notification 45 with visual characteristics (e.g., yellow (cautionary) coloring with a corresponding icon).

At Block 70, the recalled products server 40 determines if the image data corresponds to a recalled product based upon the product identifier data, and when so, generates a second user notification 46 (Block 72). If it is determined at Block 70 that the image data does not correspond (e.g., sufficient to exceed a threshold), the operations continue to Block 74.

Figure 5:
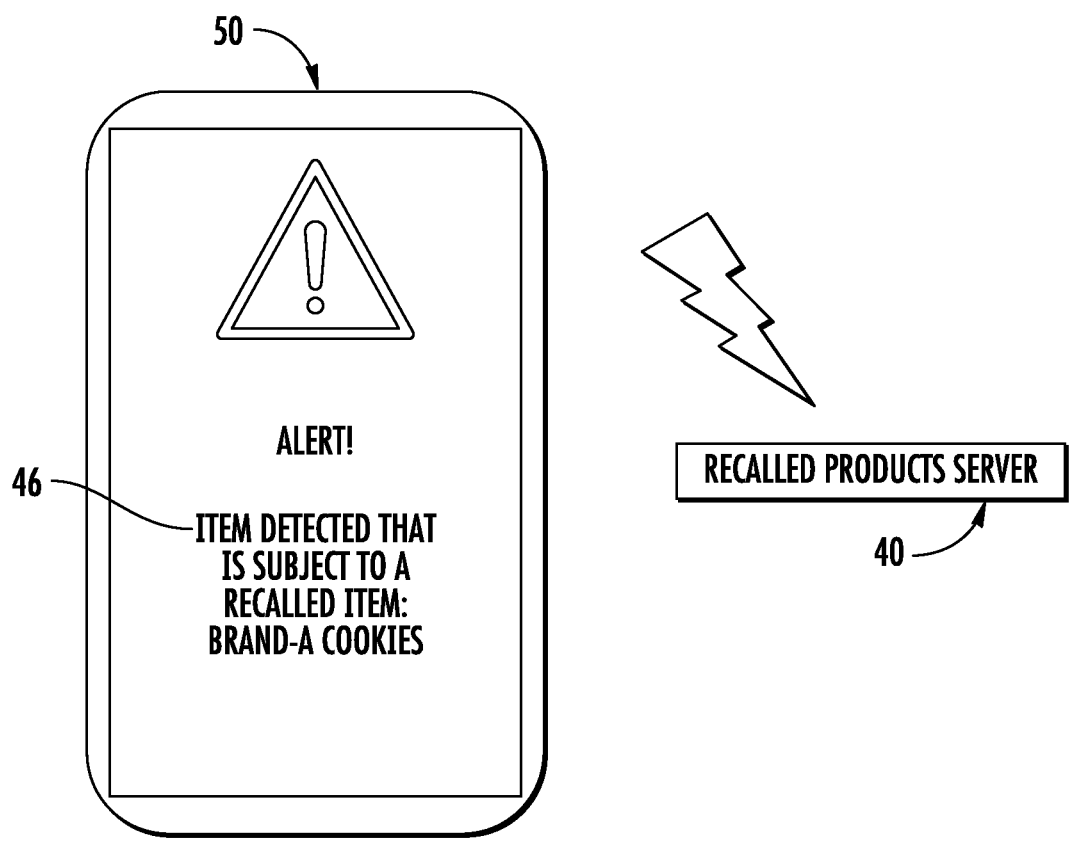
FIG. 5 is a schematic diagram of a portion of a recalled product detection and notification system illustrating a second user notification in accordance with an embodiment.

Referring additionally to FIG. 5, the second user notification 46 may be considered a second level notification, for example, identifying a higher level of potential risk or that a consumable product 22 is subject to a recall. In an exemplary implementation, Brand-A cookies are subject to a recall, and if the camera device 30 captures image data of Brand-A cookies on a countertop in a food preparation area, the recalled products server 40 may determine that the image data is indicative of Brand-A cookies. As will be appreciated by those skilled in the art, a captured UPC may be used to positively identify a recalled product. The recalled products server 40 may then generate the second user notification 46 that the object representative of the image data is subject to a recall.

The second user notification 46 may be communicated, for example, wirelessly, from the recalled products server 40 to the mobile wireless communications device 50 associated with the user. Similar to the first user notification 45, the second user notification 46 may be an email, short message service (SMS) message, visual notification, or other type of notification. For example, with respect to a visual notification, the mobile wireless communications 50 may display the second user notification 46 with visual characteristics (e.g., red (alert) coloring with a corresponding icon) that are different that any visual characteristics of the first user notification 45.

At Block 74, the recalled products server 40 determines if the captured image data corresponds to a recalled product based upon the historical product identifier data for the given user. If, at Block 74, it is determined that the captured image data corresponds to a recalled product based upon the historical product identifier data for the given user, the recalled products server 40 generates a third user notification 47 (Block 76). The recalled products server 40 may make the determination based upon the product category and/or product identifier.

Figure 6:
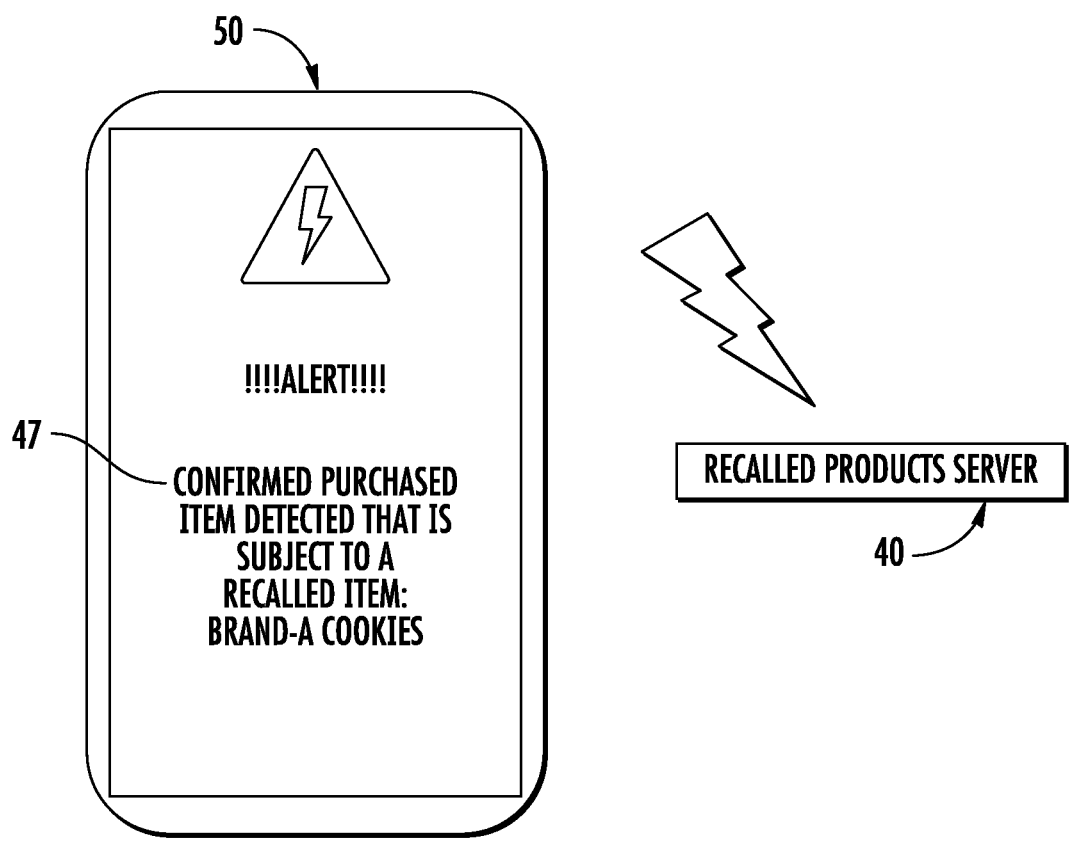
FIG. 6 is a schematic diagram of a portion of a recalled product detection and notification system illustrating a third user notification in accordance with an embodiment.

Referring additionally to FIG. 6, the third user notification 47 may serve as an indicator or confirmation that the given has in fact purchased the recalled product. The third user notification 47 may be considered a third level notification, for example, confirming that the user purchased a consumable product 22 that may be subject to a recall (e.g., based upon the category data) or is subject to a recall (e.g., based upon the product identifier data).

The third user notification 47 may be communicated, for example, wirelessly, from the recalled products server 40 to the mobile wireless communications device 50. The third user notification 47 may be an email, short message service (SMS) message, visual notification, or other type of notification. For example, with respect to a visual notification, the mobile wireless communications 50 may display the third user notification with visual characteristics (e.g., purple (alert) coloring with a corresponding icon). The operations end at Block 78.

As will be appreciated by those skilled in the art, the recalled products server 40 may determine if the captured image data corresponds to a recalled product or category of recalled products based upon image recognition techniques. Such image recognition techniques may include artificial intelligence (AI) and machine learning techniques, for example, by classifying images into classes and extracting higher-level features. Exemplary image classification techniques or models may include Inception-v3 and TensorFlow. Of course, other image classifying or matching techniques or models may be used.

Figure 7:
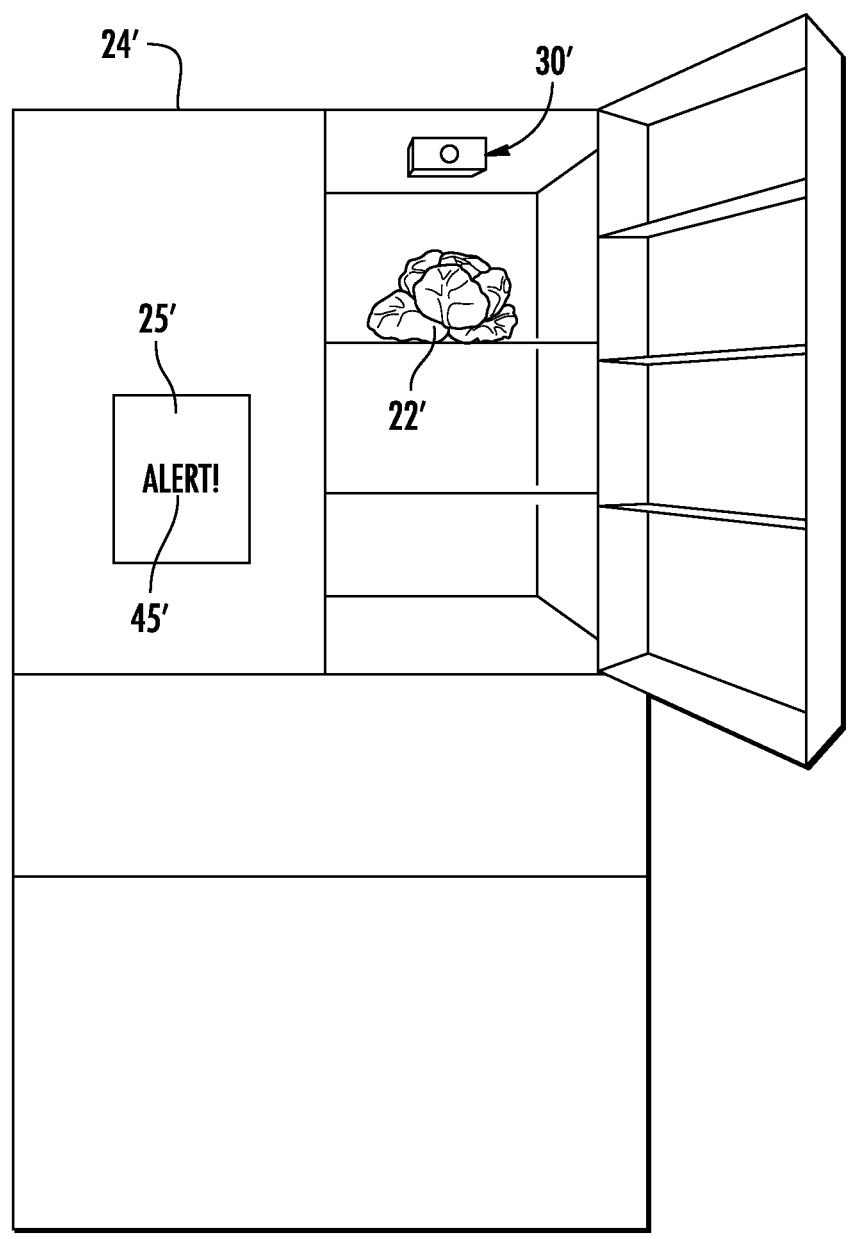
FIG. 7 is a diagram of a recalled product detection and notification system according to another embodiment.
Figure 8:
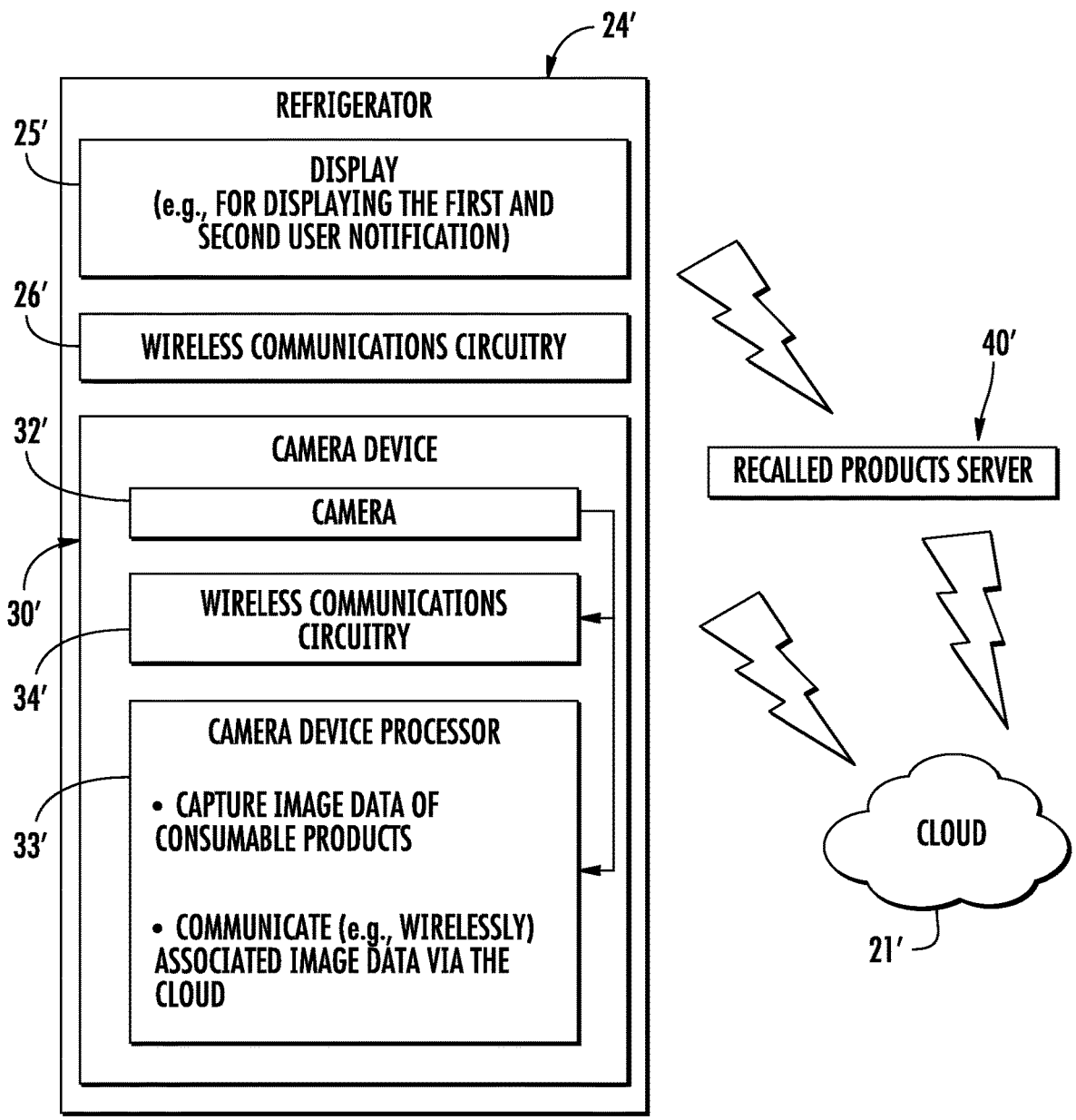
FIG. 8 is a schematic diagram of the recalled product detection and notification system of FIG. 7.

Referring now to FIGS. 7 and 8, in another embodiment, the camera device 30' may be configured to be positioned to be within a refrigerator 24'. For example, the camera device 30' may be carried within the refrigerator 24' on a shelf or may monitor or capture image data of consumable products 22' moving in and out of the refrigerator. The camera device 30' includes wireless communications circuitry 34' and a camera device processor 33' similar to the embodiments described above.

The refrigerator 24' may have a display 25', for example, carried by an exterior of a door and wireless communications circuitry 26'. In some embodiments, the wireless communications circuitry 26' of the refrigerator 24' may be shared with the camera device 30' and thus the wireless communications circuitry 34' of the camera device may not be included, and vice versa. The recalled products server 40' may communicate, for example, wirelessly, the first and second user notifications 45', 46' to the display 25' for display thereon. The first and second user notifications 45', 46' may also be communicated to the mobile wireless communications device 50' as described above. Moreover, the term refrigerator should not be understood to be limited to just refrigeration devices, but includes refrigerator/freezer devices and freezer only devices. Operations of the camera device 30' and the recalled products server 40' with respect to capturing image data and making determinations based thereon are similar to those described above and need not be repeated herein. Elements illustrated but specifically described are similar to elements described and those descriptions also need not be repeated herein.

Figure 9:
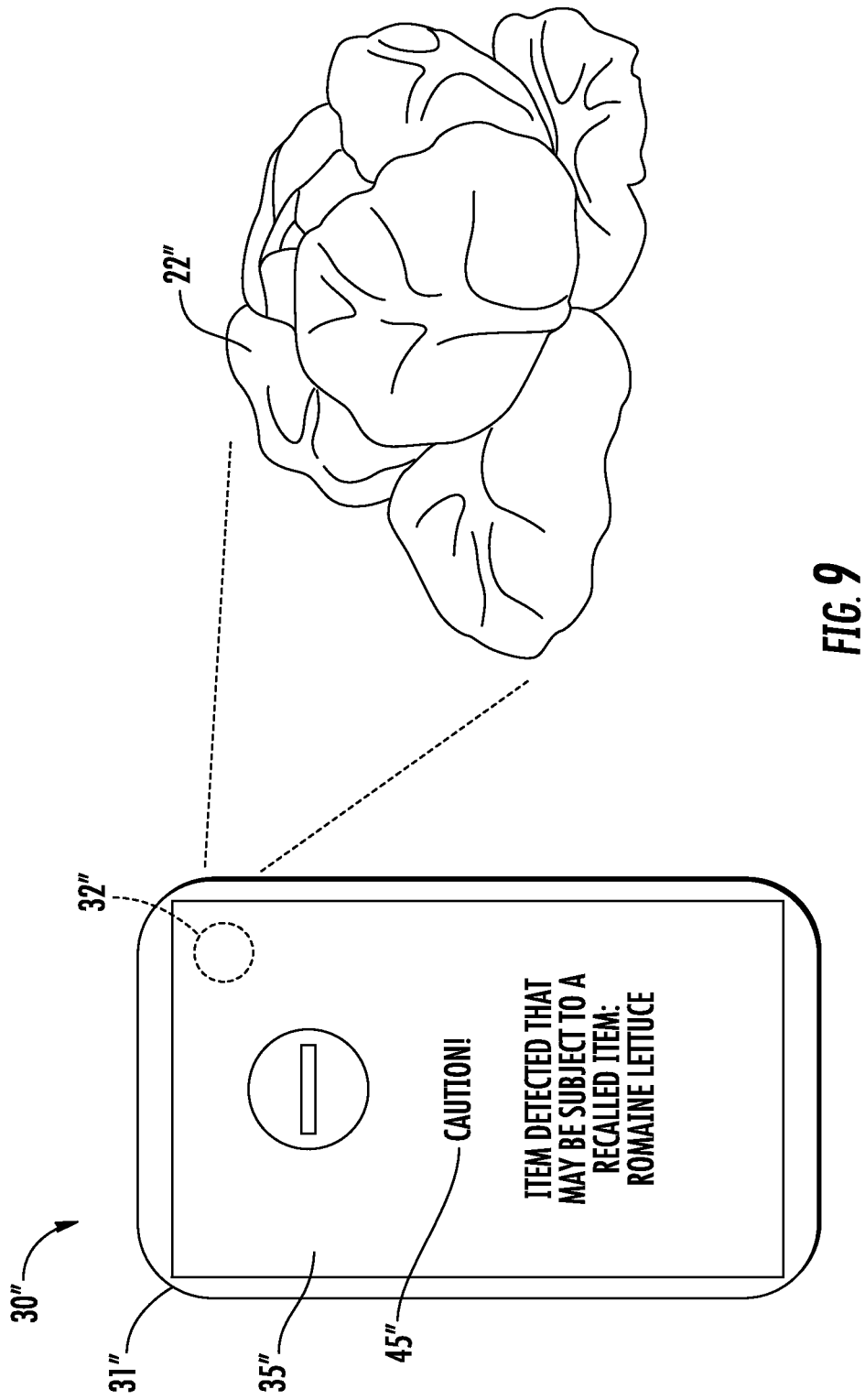
FIG. 9 is a diagram of a recalled product detection and notification system according to another embodiment.
Figure 10:
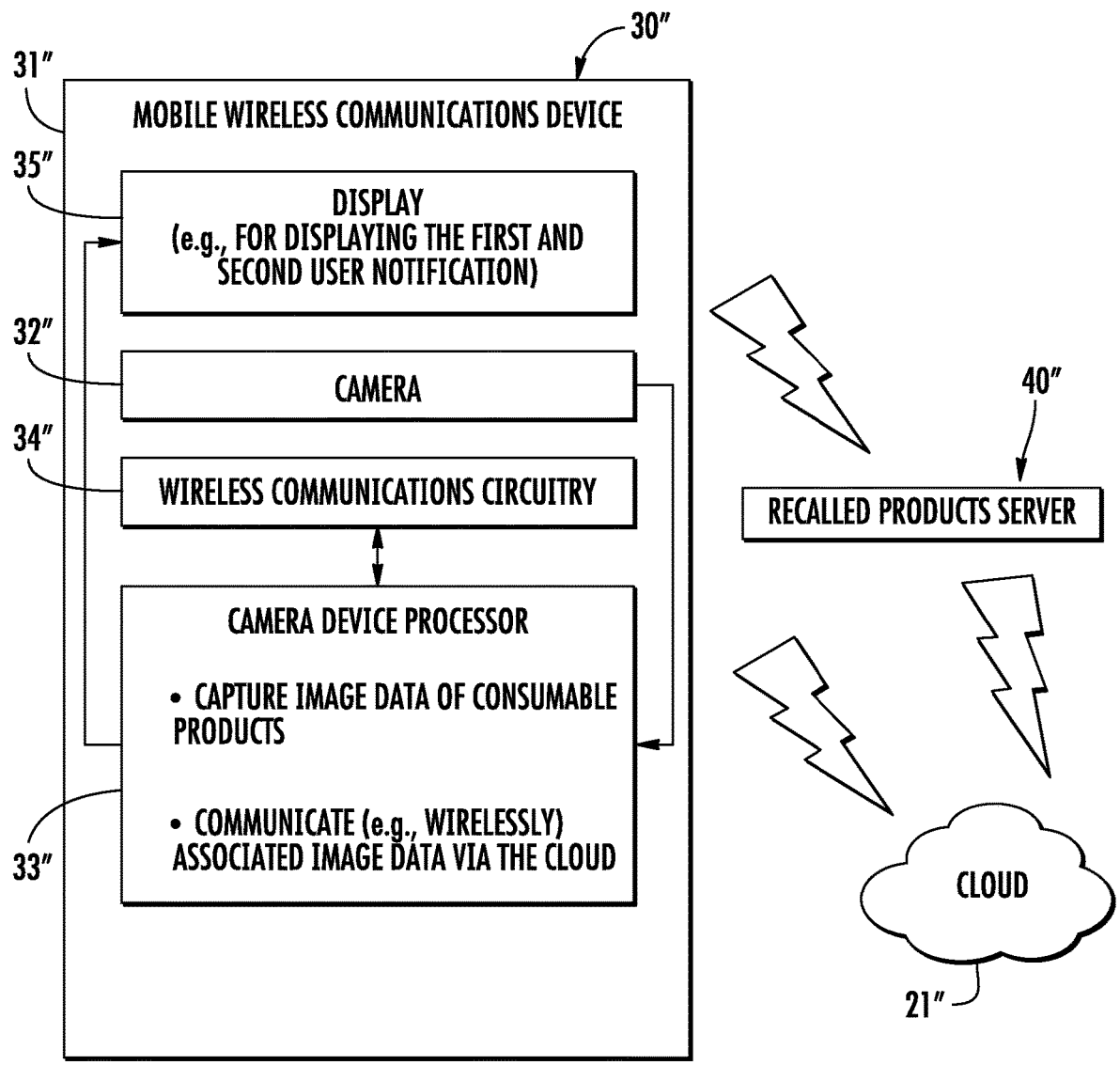
FIG. 10 is a schematic diagram of the recalled product detection and notification system of FIG. 9.

Referring now to FIGS. 9 and 10, in another embodiment, the camera device 30" is in the form of a mobile wireless communications device. Accordingly, the mobile wireless communications device 30" may be positioned by the user to capture image data of consumable products, for example, at a desirable location where consumable products are handled. The mobile wireless communications device 30" may also include a display 35", a camera 32", and wireless communications circuitry 34" coupled to the camera device processor 33". Embodied in a mobile wireless communications device, the camera device processor 33" may also perform other functions, such as, for example, wireless communications functions (e.g., voice, data) and executing applications. The recalled products server 40" may communicate, for example, wirelessly, the first and second user notifications 45", 46" to the mobile wireless communications device 30" for display on the display 35". The first and second user notifications 45", 46", may also (or alternatively) be communicated to another mobile wireless communications device as described above. Operations of the camera device 30" or mobile wireless communications device and the recalled products server 40" with respect to capturing image data and making determinations based thereon are similar to those described above and need not be repeated herein. Elements illustrated but specifically described are similar to elements described and those descriptions also need not be repeated herein.

As will be appreciated by those skilled in the art, the recalled product detection and notification system 20 may advantageously provide multiple levels of notification by which to notify a given user that they may be (e.g., possibly or confirmed) in possession of a recalled product. The recalled product detection and notification system 20 captures the image data in an active or continuous fashion that is integrated within the user's consumable product environment.

A method aspect is directed to a method of generating a recalled product notification 45, 46, 47. The method includes using a recalled products server 40 to communicate via the cloud 21 with a camera device 30 positioned to capture image data of consumable products 22 and communicate associated image data via the cloud, and download image data from the cloud. The method also includes using the recalled products server 40 to determine if the image data corresponds to a product category of recalled products based upon product category data, and when so, generate a first user notification 45. The method further includes using the recalled products server 40 to determine if the image data corresponds to a recalled product based upon product identifier data, and when so, generate a second user notification 46.

A computer readable medium aspect is directed to a non-transitory computer readable medium for a recalled products server 40 that includes a memory 41 configured to store product category data associated with recalled products and product identifier data associated with the recalled products and a processor 42 coupled to the memory. The non-transitory computer readable medium includes computer executable instructions that when executed by the processor 42 cause the processor to perform operations. The operations include communicating via the cloud 21 with a camera device 30 positioned to capture image data of consumable products 22 and communicate associated image data via the cloud, and downloading image data from the cloud. The operations also include determining if the image data corresponds to a product category of recalled products based upon the product category data, and when so, generating a first user notification 45. The operations further include determining if the image data corresponds to a recalled product based upon the product identifier data, and when so, generating a second user notification 46.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A recalled product detection and notification system comprising:
   a user device associated with a given user;
   a camera device positioned at a fixed location and physically spaced from the user device to continuously capture image data of consumable products at the fixed location and communicate image data associated with the continuously captured image data via the cloud; and
   a recalled products server comprising
      a memory configured to store product category data associated with recalled products and product identifier data associated with the recalled products, and
      a processor coupled to the memory and configured to
         communicate via the cloud with the camera device and download image data therefrom,
         use machine learning based image recognition to determine if the image data corresponds to a product category of recalled products based upon the product category data by classifying the image data into classes and extracting high-level image features from the image data to classify the image data as belonging to the product category based upon a first image data correspondence threshold, and when the image data is determined to correspond to the product category, generate a first user notification icon having a first shape and color, and corresponding first text associated therewith indicative of a first level of potential risk that at least one consumable product is subject to a recall, and communicate the first user notification icon to the user device for display thereon, and
         use machine learning based image recognition to determine if the image data corresponds to a recalled product based upon the product identifier data by classifying the image data into classes and extracting the high-level image features from the image data to classify the image data as corresponding to the recalled product based upon a second image data correspondence threshold greater than the first image data correspondence threshold, and when the image data is determined to correspond to the recalled product, generate a second user notification icon having a second shape and color, and corresponding second text associated therewith indicative of a second level of potential risk that the at least one consumable product is subject to a recall, the second shape and color, and corresponding second text being different than the first shape and color and corresponding first text, the second icon indicative of a second level of potential risk more severe than the first level of potential risk that the at least one consumable product is subject to a recall, and communicate the second user notification icon to the user device for display thereon.

2. The recalled product detection and notification system of claim 1 wherein the memory is configured to store historical product identifier data corresponding to previously purchased consumable products of the given user; and wherein the processor is configured to determine if the image data corresponds to a recalled product based upon the historical product identifier data for the given user, and when so, generate a third user notification icon having a third shape and color, and corresponding third text associated therewith indicative of a third level of potential risk that the at least one consumable product is subject to a recall, the third shape and color, and corresponding third text being different than the first and second shapes and colors and corresponding first and second texts.

3. The recalled product detection and notification system of claim 1 wherein the camera device is configured to be positioned within a refrigerator.

4. The recalled product detection and notification system of claim 3 wherein the refrigerator comprises a display defining the user device; and wherein the processor is configured to communicate the first and second user notification icons to the display for display thereon.

5. The recalled product detection and notification system of claim 1 wherein the camera device comprises a camera and wireless communications circuitry coupled thereto to wirelessly communicate the image data.

6. The recalled product detection and notification system of claim 1 wherein the first user notification icon is indicative that the consumable product may be subject to a recall, and wherein the second user notification icon is indicative that the consumable product is subject to a recall.

7. The recalled product detection and notification system of claim 1 wherein the user device comprises a mobile wireless communications device associated with the given user; and wherein the processor is configured to wirelessly communicate the first and second user notification icons to the mobile wireless communications device for display thereon.

8. The recalled product detection and notification system of claim 1 wherein the processor is configured to communicate the first and second user notification icons as at least one of an email and a short message service (SMS) message.

9. The recalled product detection and notification system of claim 1 wherein the product category data comprises product physical characteristic data.

10. The recalled product detection and notification system of claim 1 wherein the product identifier data comprises uniform product code (UPC) data.

11. The recalled product detection and notification system of claim 1 wherein the product identifier data comprises price look-up (PLU) data.

12. A recalled products server comprising:
a memory configured to store product category data associated with recalled products and product identifier data associated with the recalled products; and
a processor coupled to the memory and configured to
communicate via the cloud with a camera device positioned at a fixed location to continuously capture image data of consumable products at the fixed location and communicate image data associated with the continuously captured image data via the cloud, and download image data from the cloud,
use machine learning based image recognition to determine if the image data corresponds to a product category of recalled products based upon the product category data by classifying the image data into classes and extracting high-level image features from the image data to classify the image data as belonging to the product category based upon a first image data correspondence threshold, and when the image data is determined to correspond to the product category, generate a first user notification icon having a first shape and color, and corresponding first text associated therewith indicative of a first level of potential risk that at least one consumable product is subject to a recall, and communicate the first user notification icon to a user device physically spaced from the camera device and associated with a given user for display on the user device, and
use machine learning based image recognition to determine if the image data corresponds to a recalled product based upon the product identifier data by classifying the image data into classes and extracting the high-level image features from the image data to classify the image data as corresponding to the recalled product based upon a second image data correspondence threshold greater than the first image data correspondence threshold, and when the image data is determined to correspond to the recalled product generate a second user notification icon having a second shape and color, and corresponding second text associated therewith indicative of a second level of potential risk that the at least one consumable product is subject to a recall, the second shape and color, and corresponding second text being different than the first shape and color and corresponding first text, the second icon indicative of a second level of potential risk more severe than the first level of potential risk that the at least one consumable product is subject to a recall, and communicate the second user notification icon to the user device for display thereon.

13. The recalled products server of claim 12 wherein the memory is configured to store historical product identifier data corresponding to previously purchased consumable products of the given user; and wherein the processor is configured to determine if the image data corresponds to a recalled product based upon the historical product identifier data for the given user, and when so, generate a third user notification icon having a third shape and color, and corresponding third text associated therewith indicative of a third level of potential risk that the at least one consumable product is subject to a recall, the third shape and color, and corresponding third text being different than the first and second shapes and colors and corresponding first and second texts.

14. The recalled products server of claim 12 wherein the camera device is configured to be positioned within a refrigerator comprising a display defining the user device; and wherein the processor is configured to communicate the first and second user notification icons to the display for display thereon.

15. The recalled products server of claim 12 wherein the processor is configured to communicate the first and second user notification icons as at least one of an email and a short message service (SMS) message.

16. A method of generating a recalled product notification comprising:
using a recalled products server to
communicate via the cloud with a camera device positioned at a fixed location to continuously capture image data of consumable products at the fixed location and communicate image data associated with the continuously captured image data via the cloud, and download image data from the cloud,
use machine learning based image recognition to determine if the image data corresponds to a product category of recalled products based upon product category data by classifying the image data into classes and extracting high-level image features from the image data to classify the image data as belonging to the product category based upon a first image data correspondence threshold, and when the image data is determined to correspond to the product category, generate a first user notification icon having a first shape and color, and corresponding first text associated therewith indicative of a first level of potential risk that at least one consumable product is subject to a recall, and communicate the first user notification icon to a user device physically spaced from the camera device for display on the user device, and
use machine learning based image recognition to determine if the image data corresponds to a recalled product based upon product identifier data by classifying the image data into classes and extracting the high-level image features from the image data to classify the image data as corresponding to the recalled product based upon a second image data correspondence threshold greater than the first image data correspondence threshold, and when the image data is determined to correspond to the recalled product, generate a second user notification icon having a second shape and color, and corresponding second text associated therewith indicative of a second level of potential risk that the at least one consumable product is subject to a recall, the second shape and color, and corresponding second text being different than the first shape and color and corresponding first text, the second icon indicative of a second level of potential risk more severe than the first level of potential risk that the at least one consumable product is subject to a recall, and communicate the second user notification icon to the user device for display thereon.

17. The method of claim 16 wherein using the recalled products server comprises using the recalled products server to determine if the image data corresponds to a recalled product based upon historical product identifier data corresponding to previously purchased consumable products of the given user, and when so, generate a third user notification icon having a third shape and color, and corresponding third text associated therewith indicative of a third level of potential risk that the at least one consumable product is subject to a recall, the third shape and color, and corresponding third text being different than the first and second shapes and colors and corresponding first and second texts.

18. The method of claim 16 wherein the camera device is configured to be positioned within a refrigerator comprising a display defining the user device; and wherein using the recalled products server comprises using the recalled products server to communicate the first and second user notification icons to the display for display thereon.

19. The method of claim 16 wherein using the recalled products server comprises using the recalled products server to communicate the first and second user notification icons as at least one of an email and a short message service (SMS) message.

20. A non-transitory computer readable medium for a recalled products server comprising a memory configured to store product category data associated with recalled products and product identifier data associated with the recalled products and a processor coupled to the memory, the non-transitory computer readable medium comprising computer executable instructions that when executed by the processor cause the processor to perform operations comprising:
communicating via the cloud with a camera positioned at a fixed location to continuously capture image data of consumable products at the fixed location and communicate image data associated with the continuously captured image data via the cloud, and downloading image data from the cloud;
using machine learning based image recognition to determine if the image data corresponds to a product category of recalled products based upon the product category data by classifying the image data into classes and extracting high-level image features from the image data to classify the image data as belonging to the product category based upon a first image data correspondence threshold, and when the image data is determined to correspond to the product category, generating a first user notification icon having a first shape and color, and corresponding first text associated therewith indicative of a first level of potential risk that at least one consumable product is subject to a recall, and communicate the first user notification icon to a user device physically spaced from the camera device for display on the user device; and
using machine learning based image recognition to determine if the image data corresponds to a recalled product based upon the product identifier data by classifying the image data into classes and extracting the high-level image features from the image data to classify the image data as corresponding to the recalled product based upon a second image data correspondence threshold greater than the first image data correspondence threshold, and when the image data is determined to correspond to the recalled product, generating a second user notification icon having a second shape and color, and corresponding second text associated therewith indicative of a second level of potential risk that the at least one consumable product is subject to a recall, the second shape and color, and corresponding second text being different than the first shape and color and corresponding first text, the second icon indicative of a second level of potential risk more severe than the first level of potential risk that the at least one consumable product is subject to a recall, and communicate the second user notification icon to the user device for display thereon.

21. The non-transitory computer readable medium of claim 20 wherein the operations comprise determining if the image data corresponds to a recalled product based upon historical product identifier data corresponding to previously purchased consumable products of the given user stored in the memory, and when so, generate a third user notification icon having a third shape and color, and corresponding third text associated therewith indicative of a third level of potential risk that the at least one consumable product is subject to a recall, the third shape and color, and corresponding third text being different than the first and second shapes and colors and corresponding first and second texts.

22. The non-transitory computer readable medium of claim 20 wherein the camera device is configured to be positioned within a refrigerator comprising a display defining the user device; and wherein the operations comprise communicating the first and second user notification icons to the display for display thereon.

23. The non-transitory computer readable medium of claim 20 wherein the operations comprise communicating the first and second user notification icons as at least one of an email and a short message service (SMS) message.

24. The recalled product detection and notification system of claim 1 wherein the camera device is configured to be positioned under a kitchen cabinet facing one of a countertop and a food preparation area.

* * * * *